(12) United States Patent
Aaltonen et al.

(10) Patent No.: US 8,768,326 B2
(45) Date of Patent: *Jul. 1, 2014

(54) SYSTEM AND ASSOCIATED TERMINAL, METHOD, AND COMPUTER PROGRAM PRODUCT FOR CONFIGURING AND UPDATING SERVICE ACCESS POINTS AND PROVIDING SERVICE CONTENT IN THE MOBILE DOMAIN

(75) Inventors: Janne Aaltonen, Turku (FI); Ari Hannikainen, Turku (FI); Ahti Muhonen, Hirvihaara (FI); Juha Salo, Littoinen (FI); Antti-Pentti Vainio, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,117

(22) Filed: Apr. 26, 2012

(65) Prior Publication Data

US 2012/0207136 A1 Aug. 16, 2012

Related U.S. Application Data

(63) Continuation of application No. 10/833,517, filed on Apr. 28, 2004, now Pat. No. 8,184,602.

(51) Int. Cl.
*H04M 3/00* (2006.01)
*H04M 3/42* (2006.01)

(52) U.S. Cl.
USPC ........................................ 455/418; 455/414.1

(58) Field of Classification Search
USPC ............. 455/414.1–414.4, 435.1, 435.2, 558, 455/436–444, 418–420; 370/259–271, 469, 370/369; 379/157–158, 201.01–218.02; 709/203; 463/62, 42; 717/168–173
See application file for complete search history.

(56) References Cited

U.S. PATENT DOCUMENTS 6,052,581 A 4/2000 O'Connell et al.
6,188,909 B1 2/2001 Alanara et al.
(Continued)

FOREIGN PATENT DOCUMENTS

EP 0 786 915 A2 7/1997
EP 0 948 165 A1 10/1999
(Continued)

OTHER PUBLICATIONS

European Office Action for corresponding EP Application No. 05 718 483.0-2412, Mar. 13, 2009, Europe.
(Continued)

*Primary Examiner* — Daniel Lai
(74) *Attorney, Agent, or Firm* — Ditthavong Mori & Steiner, P.C.

(57) ABSTRACT

Various techniques for service access point configuration for mobile terminals of wireless systems are provided. Pre-configured service access point settings may be provided on a multimedia memory card with a client application capable of configuring the service access point settings in the mobile terminal from the pre-configured service access point settings on the multimedia memory card. Over-the-air updating of service access point settings may be performed by communication between a service access point and a mobile terminal or a client application on the mobile terminal for automatically configuring service access point settings on the mobile terminal based upon information provided by the service access point. Service content specific pricing in the mobile domain is also provided. Service content specific pricing content delivery may be provided through a particular service access point configured for the service content specific pricing.

26 Claims, 9 Drawing Sheets

(56) References Cited

U.S. PATENT DOCUMENTS

| | | |
|---|---|---|
| 6,269,395 B1 | 7/2001 | Blatherwick et al. |
| 6,381,454 B1 | 4/2002 | Tiedemann, Jr. et al. |
| 6,493,549 B1 | 12/2002 | Axelson et al. |
| 6,549,770 B1 | 4/2003 | Marran |
| 6,549,771 B2 | 4/2003 | Chang et al. |
| 6,587,685 B2 | 7/2003 | Mittal et al. |
| 6,615,038 B1 | 9/2003 | Moles et al. |
| 6,625,451 B1 | 9/2003 | La Medica, Jr. et al. |
| 6,993,328 B1 | 1/2006 | Oommen |
| 7,036,143 B1* | 4/2006 | Leung et al. .................. 726/15 |
| 7,107,066 B2* | 9/2006 | Toth et al. .................. 455/458 |
| 7,568,018 B1* | 7/2009 | Hove et al. .................. 709/221 |
| 7,881,745 B1* | 2/2011 | Rao et al. .................. 455/551 |
| 2001/0001089 A1 | 5/2001 | Krishnamurthi et al. |
| 2001/0024953 A1* | 9/2001 | Balogh .................. 455/432 |
| 2002/0002503 A1 | 1/2002 | Matsuoka |
| 2002/0039892 A1 | 4/2002 | Lindell |
| 2002/0160763 A1 | 10/2002 | Mittal et al. |
| 2003/0143989 A1 | 7/2003 | Ho et al. |
| 2003/0152039 A1 | 8/2003 | Roberts |
| 2003/0171129 A1 | 9/2003 | Sagne |
| 2003/0182392 A1 | 9/2003 | Kramer |
| 2003/0186744 A1 | 10/2003 | Bradell |
| 2003/0187963 A1 | 10/2003 | Tsai et al. |
| 2003/0204574 A1 | 10/2003 | Kupershmidt |
| 2003/0214943 A1* | 11/2003 | Engstrom et al. .................. 370/353 |
| 2004/0203648 A1 | 10/2004 | Wong |
| 2004/0203684 A1 | 10/2004 | Jokinen et al. |
| 2004/0203941 A1 | 10/2004 | Kaplan et al. |
| 2004/0260791 A1 | 12/2004 | Jerbi et al. |
| 2005/0043019 A1 | 2/2005 | Nakamura et al. |
| 2005/0080884 A1* | 4/2005 | Siorpaes et al. .................. 709/223 |
| 2005/0141438 A1 | 6/2005 | Quetglas et al. |
| 2005/0165909 A1 | 7/2005 | Cromer et al. |
| 2006/0116507 A1 | 6/2006 | Oppermann et al. |

FOREIGN PATENT DOCUMENTS

| | | |
|---|---|---|
| EP | 1 045 600 A1 | 10/2000 |
| EP | 1 271 881 A1 | 1/2003 |
| EP | 1 296 481 A1 | 3/2003 |
| GB | 2 287 855 A1 | 9/1995 |
| WO | WO 97/32439 A2 | 9/1997 |
| WO | WO 02/071287 A2 | 9/2002 |
| WO | WO 03/036491 A1 | 5/2003 |
| WO | WO 2004/107788 A1 | 12/2004 |

OTHER PUBLICATIONS

European Office Action for corresponding EP Application No. 05 718 483.0-2412, Sep. 23, 2009, Europe.

European Office Action for corresponding EP Application No. 11158146.8-2412, May 20, 2011, pp. 1-8.

Indian Office Action for corresponding IN Application No. 6502/DELNP/2006, Jun. 27, 2011, pp. 1-2.

IP Datacasting Technology—Bringing TV to the Mobile Phone, Nokia Connecting People, White Paper, 2003, pp. 1-7.

Mobile Video Services, The Next Step in Mobility and Visual Gratification, Nokia Connecting People, White Paper, 2003, pp. 1-15.

Periodically (Defintion): http://www.merriam-webster.com/dictionary/periodically printed from Internet on May 12, 2011.

Video and Streaming in Nokia Phones, Forum Nokia, Version 1.0, Jun. 2003, pp. 1-17.

\* cited by examiner

SYSTEM AND ASSOCIATED TERMINAL, METHOD, AND COMPUTER PROGRAM PRODUCT FOR CONFIGURING AND UPDATING SERVICE ACCESS POINTS AND PROVIDING SERVICE CONTENT IN THE MOBILE DOMAIN

CROSS REFERENCE TO RELATED APPLICATIONS

This application is a continuation of U.S. application Ser. No. 10/833,517, filed Apr. 28, 2004, the entirety of which is incorporated herein.

FIELD OF THE INVENTION

The present invention relates generally to systems and methods for controlling and downloading content, and, more particularly, to systems and associated terminals, methods, and computer program products for configuring service access points and architectures to enable content service in mobile domains.

BACKGROUND

Mobile telephones and wireless communications have advanced significantly over the recent few decades. Today, mobile communication devices, or mobile terminals, represent a significant influence on a vast portion of the world's population. In keeping stride with the advancement and impact of mobile terminals, new wireless systems, devices, protocols, and services are developed and introduced to further the use of these technologies, and consumers continue to demand even more advanced wireless functionality and capabilities. For example, mobile terminals now offer technologies that far surpass simply allowing voice communications. Such technologies include text messaging, multimedia messaging and communications, e-mail, Internet browsing, and access to a wide range of wireless applications and services.

The deployment of advanced high bit-rate mobile networks has opened up new opportunities for delivering a host of services in a way that was not possible with earlier second generation (2G) wireless networks. Recent systems, including third generation (3G) systems, such as those specified for use with the Global System for Mobile communications (GSM) wireless standard, enable the delivery of new digital services such as video calls and the playback of multimedia comprised of audio and video. In this regard, the increased bit rates of 3G systems widen the possibilities for providing digital services.

A variety of alternative broadband delivery techniques have been suggested for the increased bit rates for delivery of high quality and high quantity media content on 3G systems. For example, one such IP Datacasting (IPDC) delivery technique is Digital Video Broadcasting (DVB). In this regard, DVB-T (terrestrial), DVB-H (handheld) or DVB-H/IP, DVB-C (cable) and DVB-S (satellite) are variants of the DVB standard. Other examples of broadband data broadcast networks include Japanese Terrestrial Integrated Service Digital Broadcasting (ISDB-T), Digital Audio Broadcasting (DAB), and Multimedia Broadcast/Multicast Service (MBMS), and those networks provided by the Advanced Television Systems Committee (ATSC). These technologies may be used for real-time consumption by way of reception of broadcast content. Additional broadband delivery techniques include General Packet Radio Service (GPRS), Enhanced Data Rates for Global Evolution (EDGE), Wideband Code Division Multiple Access (WCDMA), Code Division Multiple Access (CDMA), Wireless Local Area Network (WLAN), and Bluetooth (BT).

The combined use of mobile telecommunications with a broadband delivery technique such as DVB-T has been proposed in the past in order to achieve efficient delivery of digital services to users on the move including multimedia data and interactive services. This combination would take advantage of existing infrastructures in the effort to provide personal communications (already prevalent) and the growing demand for Internet access, together with the expected rise of digital broadcasting, so that users can receive these services with a single device. The combination of mobile telecommunications and broadband delivery techniques provides the possibility of interactive services such as uni-directional and bi-directional services such as audio and video streaming (e.g., TV, radio, etc.), file downloads, and advanced gaming applications, etc. In this regard, many conventional mobile terminals are capable of downloading content for online use (e.g., real-time and near-time streaming audio and/or video), and, more increasingly, also offline use (e.g., storing audio and/or video for subsequent access and presentation by the mobile terminal).

Similarly, computer networks, television networks, and telephony networks are experiencing unprecedented technological expansion, fueled by consumer demand. Wireless and mobile networking technologies have attempted to address related consumer demands, while providing more flexibility and immediacy of information transfer.

Current and future wireline and wireless networking technologies continue to facilitate ease of information transfer and convenience to users. The proliferation of local, regional, and global networks such as the Internet has availed a sea of information to society. These networking technologies have expanded to increasingly include wireless and mobile technologies. For example, information available via the Internet can now be downloaded onto mobile wireless units, such as cellular telephones, personal digital assistants (PDAs), laptop computers, etc. One such technology facilitating the transfer of Internet content to and from wireless devices is the Wireless Application Protocol (WAP), which integrates the Internet and other networks with wireless network platforms. Generally, Wireless Application Protocol is a set of protocols that accounts for characteristics and functionality of both Internet standards and standards for wireless services. It is independent of wireless network standards, and is designed as an open standard. Wireless Application Protocol bridges the gap between the wireline Internet paradigm and the wireless domain, to allow wireless device users to enjoy the benefits of the Internet across both platforms.

Second generation wireless service, often referred to as 2G wireless service, is a current wireless service based on circuit-switched technology. In this regard, 2G systems, such as Global System for Mobile communications (GSM) and Personal Communications Services (PCS), use digital radio technology for improved quality and a broader range of services over first generation mobile technologies. Third generation wireless service, often referred to as 3G wireless service, refers to a set of digital technologies that promises improvements in capacity, speed and efficiency by deploying new packet-based transmission methodologies between terminals and the network. Users of 3G devices and networks will have access to multimedia services such as video-on-demand, video conferencing, fast web access and file transfer. Existing and future services are, and will continue to be, provided by network service operators who make services and applications available to mobile device users via the network. Current multimedia capable phones with color displays and sufficient computational power and cellular connectivity can provide rich media services for end users. These services may be generally referred to as multimedia audio and visual services such as television or TV programs and episodes, music videos, sports events and programs, comedy programs, movies, news shows and programs, radio shows, etc. However, improvements in transmission and consumption technologies cannot be fully supported by the existing infrastructure for wireless services. In keeping with improvements to the infrastructure for wireless services, accommodations must be made for changes and service methods must be developed to account for implications of improved transmission and consumption technologies.

In order to take advantage of these various types of technologies, and, in particular, to avail a particular mobile terminal of the ability to acquire data for these technologies, a mobile device or terminal may need to be able to communicate with service access points (sAP) which may be virtual service access points, not to be confused with general connection access points (AP). General connection access points provide a mobile terminal a connection to a network. A service access point provides a mobile terminal a connection through or in a wireless network to a particular service. A service access point may be, in essence, a data tunnel or outlet from a gateway GPRS support node (GGSN) to a certain service. Frequently, a user wishing to use a particular technology, such as to download media to a mobile terminal, must configure a service access point in the mobile terminal by editing or establishing settings for the service access point. For example, a client application may require a connection to a particular service through a service access point. However, service access point settings vary between operators and service providers. Service access point settings may define, for example, where and how a terminal IP address is allocated, what tunneling mechanism is used between a service access point and a server hosting the particular service being accessed through the service access point, data transfer billing, routing, etc. Thus, a user must configure the correct settings for any desired service access points into the mobile terminal.

Similarly, even after a service access point is properly configured in a mobile terminal, the settings for that service access point may need to be updated from time to time due to changes by the mobile operator or service provider. Additional service access points may need to be configured on the mobile terminal for a user to have the ability to download media and content from other service access points.

Currently, the typical method of configuring, updating and adding service access points is by way of manual configuration where a user inputs service access point settings into a mobile terminal from a command line or through a graphical user interface (GUI). However, manual input by a user can be inaccurate or performed incorrectly. Another typical method of configuring, updating, and adding service access points is by requesting the settings for a service access point via the Internet or by short message service (SMS) messaging. These mechanisms provide the correct service access point settings for a particular service and service access point directly to a user of a mobile terminal, typically by way of a return SMS message. Again, this method requires user interaction with the mobile terminal to correctly configure the service access point. In some applications, a user may still be required to manually input the service access point settings. In other applications, a user may be able to manually accept the returned SMS message service access point settings whereby the mobile terminal will capture the service access point settings in the returned SMS message. Although a requesting method provides less opportunity for mistake or incorrect information, requesting methods continue to rely upon manual interaction for configuring service access point settings. In addition, both of these methods, manual input and requested settings, do not adequately provide a solution to the need of a mobile operator or service provider to update service access point settings.

A typical business environment for accessing and consuming multimedia services in a mobile domain includes one agreement between a consumer or end user of a mobile terminal and the consumer's service or connectivity provider or network operator and another agreement between the consumer and a content provider. In these agreements, the consumer pays for the connection to transmit content. The connection with the service provider may be priced as a flat rate for unlimited data, a flat rate for a specific amount of data with additional costs for data exceeding the flat rate amount of data, or a price per amount of data. Similar models are used in both the mobile domain and in a fixed domain. These connectivity rates may vary depending upon factors such as available coverage, bit rates, quality of service, etc.

The consumer uses the connection from the service provider in order to access content. Content may be offered directly by a content provider that may be the content creator or a content aggregator. A content aggregator and the content creator may be the same company or corporation. Similar to the varying pricing options for connections, content may be purchased from the content provider under a purchase agreement setting forth prices per item, time period, set of content elements, quantity or amount of content, or content type. One of ordinary skill in the art will recognize that these pricing models, and the connectivity pricing models, are typical examples that have been used with 2G wireless services. These and similar pricing models may be used for 3G wireless services, but due to increased technological advances are not appropriate for various content and services that may be available for 3G wireless services.

Once the connection agreements and content agreements have been established, a consumer is able to receive content for consumption. Typically, the content is delivered from a service delivery platform of the content provider, through a network operator or service provider to the mobile terminal where the content is presented to the consumer by a client application in the mobile terminal. This type of content delivery is not aptly suited to various 3G wireless technologies and associated content and services in part due to increased bandwidth potential for content and services available for 3G technologies.

SUMMARY

In light of the foregoing background, embodiments of the present invention provide an improved system and associated terminal, method, and computer program product for configuring service access points and/or enabling service content specific pricing in the mobile domain.

Embodiments of the present invention permit a terminal to acquire service access point settings from pre-configured service access point settings that may be provided such as on a multimedia memory card with a client application. Embodiments of the present invention permit a terminal to update service access point settings over-the-air. And embodiments of the present invention permit the provision of service content specific pricing content delivery and associated billing models.

In one embodiment of a system for providing a service access point setting to a mobile terminal, the mobile terminal may accept a memory card with a pre-configured service access point setting thereon which can be used by a client application or service client application to configure a service access point setting on the mobile terminal. Pre-configured service access point settings may include a service access point name, address, user name, password, authentication setting, maximum data speed setting, session type setting, security setting, or alternate server address. In an embodiment of the present invention, a client application may reside on the same memory card with the pre-configured service access point setting or settings or may reside separately from the memory card in the mobile terminal. An embodiment of a mobile terminal of the present invention may include a memory card for insertion into a memory card port of the mobile terminal, where the memory card includes at least one pre-configured service access point setting. The mobile terminal may also include a client application that operates on the mobile terminal using a pre-configured service access point setting from the memory card. The client application may reside on the memory card with the pre-configured service access point setting or may reside in the mobile terminal. Also provided are associated terminals, methods and computer program products for embodiments of the present invention as previously described. An embodiment of the method of the present invention is also provided wherein the activation of a client application on a mobile terminal requires a service access point setting to operate, thereby initiating the configuration of a service access point setting on the mobile terminal. Thus, providing pre-configured service access point settings and automatically configuring a mobile terminal to use such settings simplifies and increases reliability of initial configuration of service access points in mobile terminals.

An embodiment of a system of the present invention is provided for updating at least one service access point setting on a mobile terminal. The mobile terminal may communicate with a wireless network, where the network provides a pre-configured service access point setting that may be delivered to the mobile terminal for use by a client application, such as to update the service access point settings on the mobile terminal. A pre-configured service access point setting provided by a wireless network to the mobile terminal may be configured on the mobile terminal as a service access point setting for the client application. A pre-configured service access point setting of an embodiment of the present invention may include any or all of the items of information previously described with respect to a pre-configured service access point setting on a memory card. In an embodiment of the present invention the downloading of a pre-configured service access point setting from a wireless network to a mobile terminal may be initiated by either the wireless network or the mobile terminal. Where the download of a pre-configured service access point setting is initiated by a mobile terminal, the initiation may be controlled by a client application on the mobile terminal. Thus, automatically updating service access point configurations with provided service access point settings simplifies the process of updating service access point configurations.

Also provided are embodiments of systems and methods for providing service content specific pricing content delivery, such as which may be used with large file download services. An embodiment of a system of the present invention may include a service content delivery gateway and a service content specific pricing service access point through which the service content specific pricing content is delivered from the service content delivery gateway to a mobile terminal, possibly to a client application on the mobile terminal. An embodiment of a method of the present invention for providing service content specific pricing content delivery may include offering service content specific pricing for at least some content, subscribing to the service content specific pricing, and delivering the content for the subscribed service content specific pricing. In one embodiment of a method of the present invention, the content is provided through a service content specific pricing service access point. The content available for service content specific pricing, in one embodiment of the present invention, may be provided or supplied by a content provider to a service provider. A consumer of an embodiment of the present invention for service content specific pricing content delivery may be charged a single fee for consumption of the content and delivery of the content. Various subscription models may be provided to the consumer for different service content specific pricing content. The price of a service content specific pricing subscription may include the cost of the content and the transmission cost for delivering the content. In one embodiment of the present invention, the subscription cost may also include the aggregation cost of a content aggregator that acquires the service content specific pricing content from a content creator and provides or supplies that content to a service provider for delivery to a consumer. Thus, service content specific pricing permits customers to pay a single fee while permitting pricing and service content offerings to be better tailored for consumer media interests and use.

BRIEF DESCRIPTION OF THE DRAWING(S)

Having thus described the invention in general terms, reference will now be made to the accompanying drawings, which are not necessarily drawn to scale, and wherein:

Figure 12:
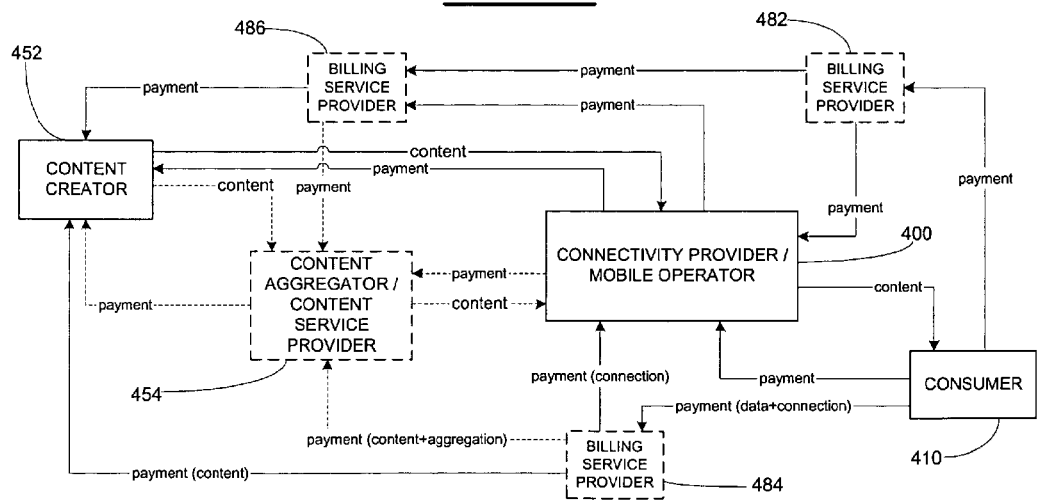
Figure 13:
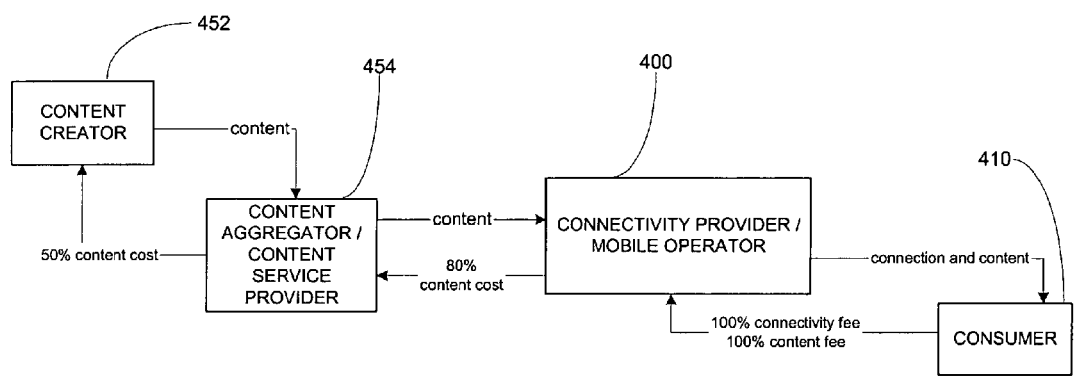

FIG. 12 is a schematic block diagram of a content system and a wireless communication system for implementing and providing service content specific pricing to a consumer, in accordance with embodiments of the present invention; and FIG. 13 is a schematic block diagram of a content system and a wireless communication system of one embodiment of the present invention for implementing and providing service content specific pricing to a consumer.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While a primary use of the present invention may be in the field of mobile phone technology, it will be appreciated from the following description that the invention is also useful for many types of devices that are generally referenced herein as mobile terminals, including, for example, handheld data terminals and personal data assistants, portable medical devices, personal multimedia units such as MP3 players, and other portable electronics. Similarly, one of ordinary skill in the art will recognize the various applications to video download, video streaming, and broadcasting technologies applicable to providing content to mobile terminals for mobile consumption.

Figure 1:
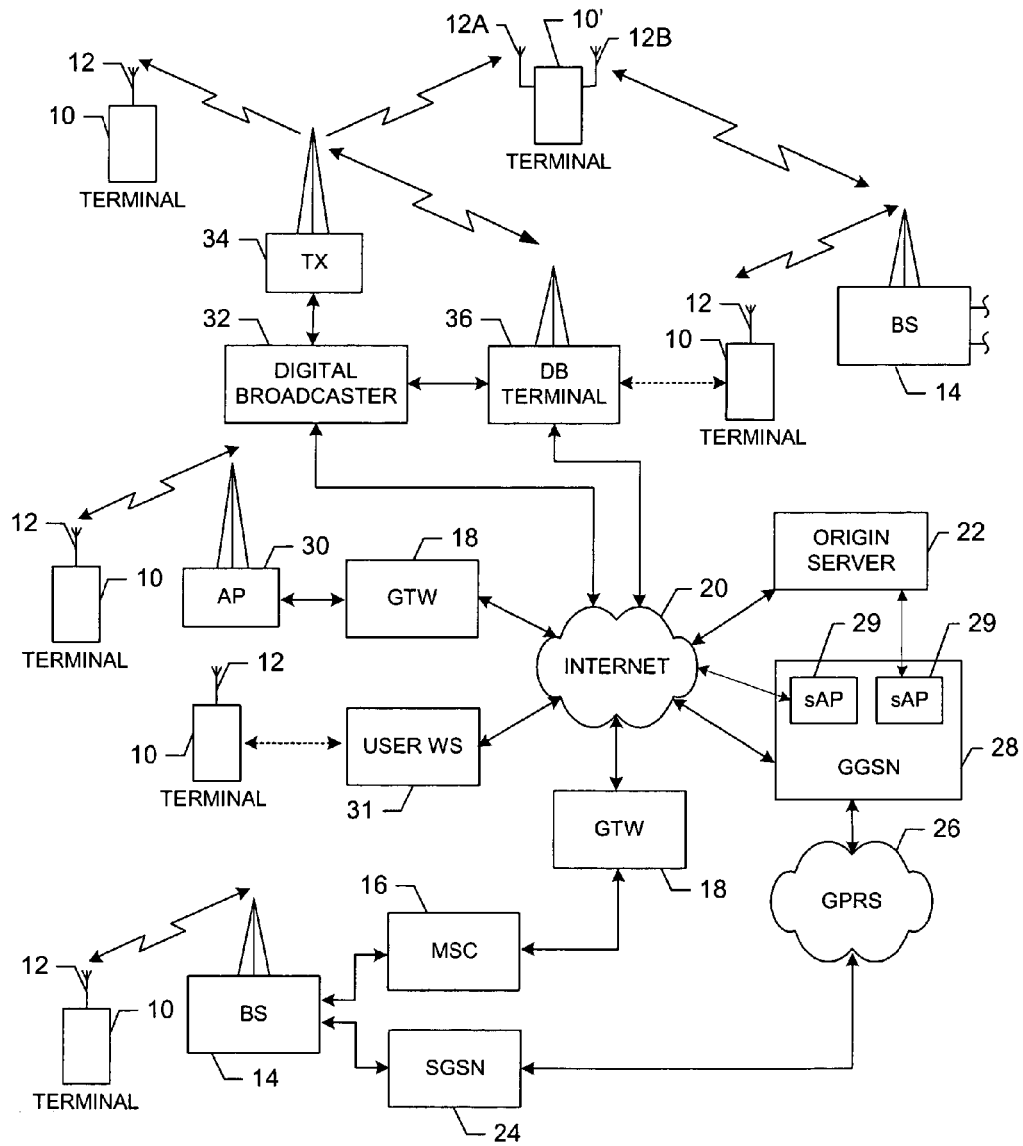
FIG. 1 is a schematic block diagram of a wireless communications system according to one embodiment of the present invention including a cellular network to which a terminal is bi-directionally coupled through wireless RF links.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, a terminal 10 may include an antenna 12 and associated transceiver for transmitting signals to and for receiving signals from a base site or base station (BS) 14. The base station 14 is a part of a cellular network that includes elements required to operate the network, such as a mobile switching center (MSC) 16. As well known to those skilled in the art, the cellular network may also be referred to as a Base Station/MSC/Interworking function (BMI). In operation, the mobile switching center 16 is capable of routing calls and messages to and from the terminal 10 when the terminal 10 is making and receiving calls. The mobile switching center 16 also provides a connection to landline trunks when the terminal 10 is involved in a call. Further, the mobile switching center 16 can be coupled to a server gateway (GTW) 18.

The mobile switching center 16 can be coupled to a data network, such as a local area network (LAN), a metropolitan area network (MAN), and/or a wide area network (WAN). The mobile switching center 16 can be directly coupled to the data network. In one typical embodiment, however, the mobile switching center 16 is coupled to a server gateway 18, and the server gateway is coupled to a WAN, such as the Internet 20. In turn, devices such as processing elements (e.g., personal computers, server computers or the like) can be coupled to the terminal 10 via the Internet 20. For example, as explained below, the processing elements can include one or more processing elements associated with an origin server 22 or the like, one of which being illustrated in FIG. 1.

In addition to the mobile switching center 16, the base station 14 can be coupled to a signaling GPRS support node (SGSN) 24. As known to those skilled in the art, the SGSN 24 is typically capable of performing functions similar to the mobile switching center 16 for packet switched services. The SGSN 24, like the mobile switching center 16, can be coupled to a data network, such as the Internet 20. An SGSN can be directly coupled to the data network. In a more typical embodiment, however, the SGSN 26 is coupled to a packet-switched core network, such as a GPRS core network 26. The packet-switched core network may then be coupled to another server gateway, such as a server gateway GPRS support node (GGSN) 28. The GGSN 28 may be coupled to the Internet 20 or comprise service access points (sAP) 29 for communication beyond the GGSN 28.

By coupling the SGSN 24 to the GPRS core network 26 and the GGSN 28, devices such as origin servers 22 can be coupled to the terminal 10 via the Internet 20, GGSN 28, and SGSN 24 or provide service to the terminal 10 via the service access point 29, GGSN 28, and SGSN 24. In this regard, devices such as origin servers can communicate with the terminal 10 across the SGSN 24, GPRS 26 and GGSN 28. For example, origin servers can provide content to a terminal such as in accordance with the Multimedia Broadcast Multicast Service (MBMS). As will be appreciated by one of ordinary skill in the art, by coupling or connecting a terminal 10 and an origin server 22, the terminal 10 can communicate with the origin server 22 to thereby carry out various functions of the terminal 10, such as to transmit data, content or the like to, and/or receive content, data or the like from, the origin server 22. As used herein, the terms "data," "content," "information" and similar terms may be used to interchangeably to refer to data capable of being transmitted, received and/or stored in accordance with embodiments of the present invention. Thus, use of any such terms should not be taken to limit the spirit and scope of the present invention.

In addition to being coupled to the base station 14, the terminal 10 can be coupled to one or more wireless access points (APs) 30. The access points 30 may be configured to communicate with the terminal 10 in accordance techniques such as, for example, radio frequency (RF), Bluetooth (BT), infrared (IrDA), or any of a number of different wireless networking techniques, including local area networking (LAN) and wireless local area networking (WLAN) techniques. Additionally, or alternatively, the terminal 10 can be coupled to one or more user workstations (WS) 31. Each user workstation 31 can comprise a computing system such as personal computers, laptop computers or the like. In this regard, the user workstations 31 can be configured to communicate with the terminal in accordance with techniques such as, for example, RF, Bluetooth, infrared, or any of a number of different wireline or wireless communication techniques, including LAN and/or WLAN techniques. One or more of the user workstations 31 can additionally, or alternatively, include a removable memory capable of storing content, which can thereafter be transferred to the terminal 10. A base station may also function as an access point.

The access points 30 and the workstations 31 may be coupled to the Internet 20. Like with the mobile switching center 16, the access points 30 and workstations 31 can be directly coupled to the Internet 20. In one advantageous embodiment, however, the access points 30 are indirectly coupled to the Internet 20 via a server gateway 18. As will be appreciated, by directly or indirectly connecting the terminals 10 and the origin server 22, as well as any of a number of other devices, to the Internet 20, the terminals 10 can communicate with one another, the origin server 22, etc., to thereby carry out various functions of the terminal 10, such as to transmit data, content or the like to, and/or receive content, data or the like from, the origin server 22.

Further, the terminal 10 can additionally, or alternatively, be coupled to a digital broadcaster 32 via a digital broadcast network, such as a terrestrial digital video broadcasting (e.g., DVB-T, DVB-H, ISDB-T, ATSC, etc.) network. As will be appreciated, by directly or indirectly connecting the terminals 10 and the digital broadcaster, the terminals 10 can receive content, such as content for one or more television, radio and/or data channels, from the digital broadcaster 32. In this regard, the digital broadcaster 32 can include, or be coupled to, a transmitter (TX) 34, such as a DVB-T transmitter. Similarly, the terminal 10 can include a receiver, such as a DVB-T receiver (not shown). The terminal 10 can be capable of receiving content from any of a number of different entities in any one or more of a different number of manners. In one embodiment, for example, a terminal 10' capable of transmitting and/or receiving data, content, or the like in accordance with a DVB (e.g., DVB-T, DVB-H, etc.) technique as well as a cellular (e.g., 1G, 2G, 2.5G, 3G, etc.) communication technique. In such an embodiment, the terminal 10' may include an antenna 12A for receiving content from the DVB-T transmitter, and another antenna 12B for transmitting signals to and for receiving signals from a base station 14 or access point 30. For more information on such a terminal, see U.S. patent application Ser. No. 09/894,532, entitled: Receiver, filed Jun. 29, 2001, the contents of which is incorporated herein by reference in its entirety.

In addition to, or in lieu of, directly coupling the terminal 10 to the digital broadcaster 32 via the transmitter 34, the terminal 10 can be coupled to a digital broadcast (DB) receiving terminal 36 which, in turn, can be coupled to the digital broadcaster 32, such as directly and/or via a transmitter. In such instances, a digital broadcast receiving terminal can comprise a DVB-T receiver, such as a DVB-T receiver in the form of a set top box. A terminal can be locally coupled to a digital broadcast receiving terminal, such as via a personal area network. In one advantageous embodiment, a terminal can additionally or alternatively be indirectly coupled to a digital broadcast receiving terminal via the Internet 20.

Figure 2:
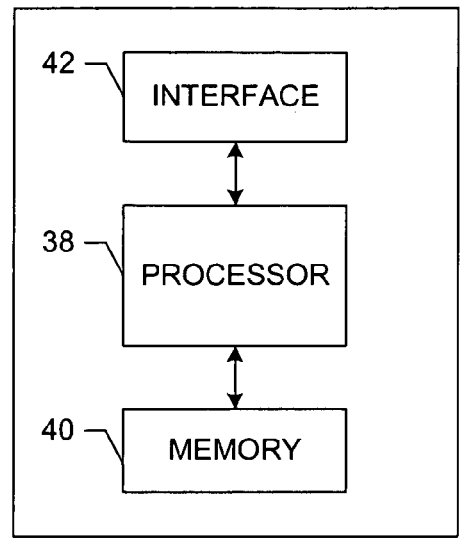
FIG. 2 is a schematic block diagram of an entity capable of operating as a terminal, origin server, digital broadcast receiving terminal and/or a digital broadcaster, in accordance with embodiments of the present invention.

Referring now to FIG. 2, a block diagram of an entity capable of operating as a terminal 10, origin server 22, digital broadcast receiving terminal 36, and/or a digital broadcaster 32 is shown in accordance with one embodiment of the present invention. Although shown as separate entities, in some embodiments, one or more entities may support one or more of a terminal, origin server, digital broadcast receiving terminal, and/or a digital broadcaster, logically separated but co-located within one entity. For example, a single entity may support a logically separated, but co-located, terminal and digital broadcast receiving terminal. Also, for example, a single entity may support a logically separate, but co-located digital broadcast receiving terminal and digital broadcaster.

As shown, the entity capable of operating as a terminal 10, origin server 22, digital broadcast receiving terminal 36, and/or a digital broadcaster 32 can generally include a processor 38 connected to a memory 40. The processor 38 can also be connected to at least one interface 42 or other means for transmitting and/or receiving data, content, or the like. The memory 40 can comprise volatile and/or non-volatile memory, and typically stores content, data, or the like. For example, the memory 40 typically stores software applications, instructions or the like for the processor 38 to perform steps associated with operation of the entity in accordance with embodiments of the present invention. Also, for example, the memory 40 typically stores content transmitted from, or received by, the terminal, digital broadcast receiving terminal, and/or digital broadcaster. A processor, memory, and interface, along with computer logic therefore such as operating system software and software applications, may comprise a client platform capable of supporting operation of client applications thereon.

One of ordinary skill in the art will recognize that a service access point may be configured with one piece of information, typically referred to as a service access point setting, or numerous pieces of information, typically referred to as service access point settings where more than one setting is required to configure a service access point. As used herein, a service access point setting and service access point settings are referred to generally as service access point settings. Although it may be possible for a service access point to be configured with a single service access point setting, such as an IF address, one of ordinary skill in the art will recognize that a common convention is to refer to the configuration for a service access point as the service access point settings, even where possibly a service access point may be configured with only one service access point setting. This convention has been used herein for clarity of the description of the present invention.

Figure 3:
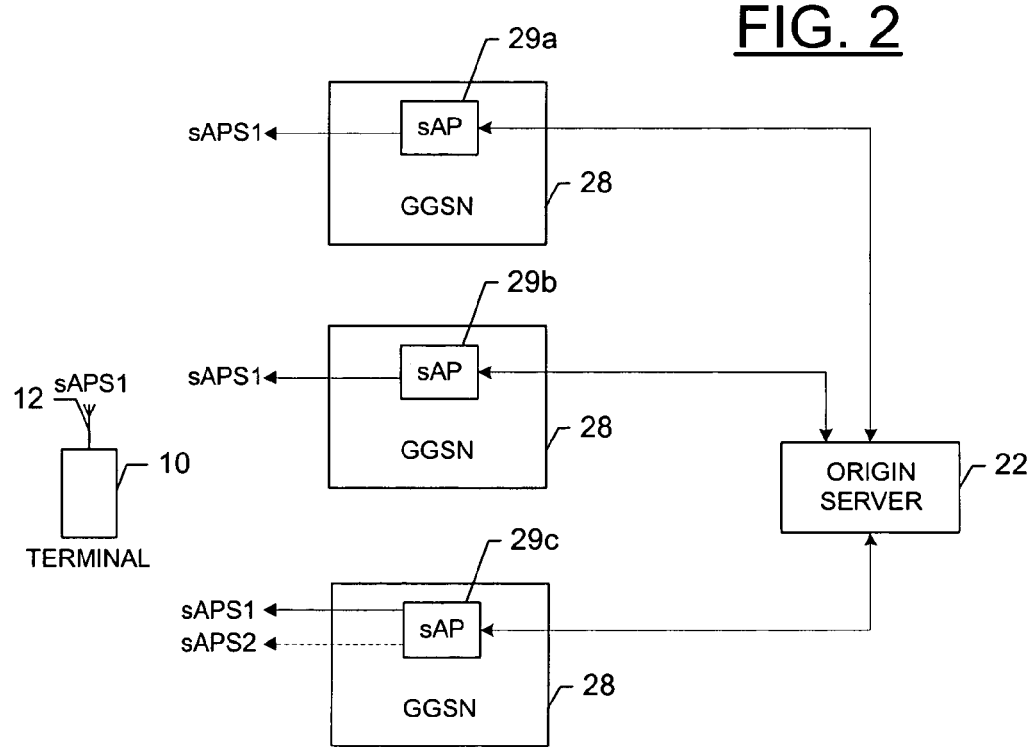
FIG. 3 is a schematic block diagram of service access point communications of a wireless communication system for updating service access point settings, in accordance with embodiments of the present invention.

FIG. 3 is a schematic block diagram of service access point communications of a wireless communication system for configuring and updating service access point settings, in accordance with embodiments of the present invention. With regard to FIG. 3, a terminal 10 may be able to communicate with origin servers 22 or other content sources transmitting via service access points 29a, 29b, and 29c which transmit using service access point settings 1 (sAPS1). As the terminal 10 moves throughout the wireless communication system, the terminal 10 will continue to be able to communicate with the various origin servers 22 because the terminal 10 has properly configured service access point settings to communicate with various service access points 29a, 29b, 29c throughout the system transmitting on service access point settings 1 (sAPS1). One of ordinary skill in the art will recognize that service access points may be configured to share service access point settings such as to allow for roaming and may be configured with unique service access point settings, such that no other service access point would use the same service access point settings. Service access points may be configured for any type of application and use. However, if a particular service access point 29c requires a change from service access point settings 1 to service access point settings 2 (sAPS2), the terminal 10 may need to be configured to communicate with that particular service access point 29c using service access point settings 2. As previously described, the terminal may be manually configured with service access point settings 2 and may be configured using manual interaction to communicate with a base station or using the Internet to retrieve service access point settings, such as service access point settings 2, for update typically provided via short message service, or an SMS message. These methods are further described with reference to FIGS. 4, 5, and 6. However, the terminals 10 may advantageously be configured without manual interaction in accordance with embodiments of the present invention as further described with reference to FIGS. 7 and 8.

Figure 4:
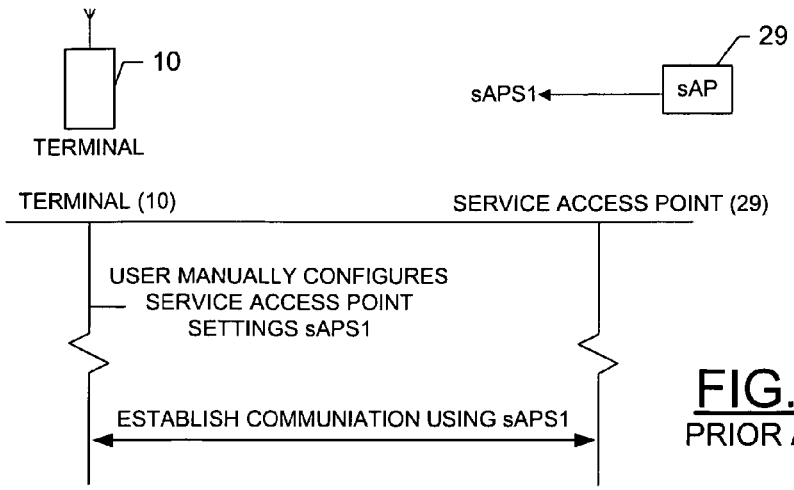
FIG. 4 is a diagram of conventional manual service access point configuration.

FIG. 4 is a diagram of conventional manual service access point configuration. As shown in FIG. 4, a user may manually configure service access point settings, such as service access point settings 1 (APS1) in order to establish communications with a service access point 29 which transmits using service access point settings 1. In such a situation, a user of terminal 10 performs the entire step of configuring the terminal 10 with service access point settings 1 without semi-automated or automated assistance. Manual configuration may be performed, for example, from a command line or using a graphical user interface (GUI).

Figure 5:
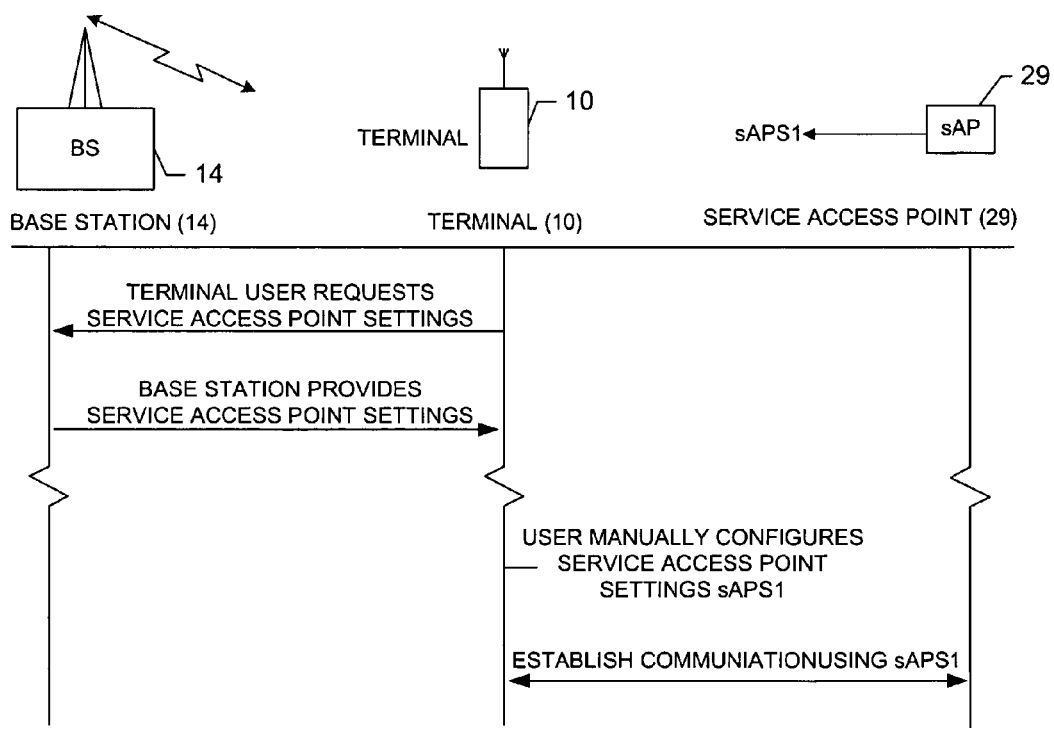
FIG. 5 is a diagram of conventional manual service access point request configuration.

As an alternative, FIG. 5 is a diagram of conventional manual service access point request configuration. This method may be referred to as a semi-automatic method. A user of a terminal 10 will request from an external source, for example, a base station 14 of the wireless provider for the terminal 10, the service access point settings for communicating with and/or through a particular service access point 29. A base station 14 may provide the service access point settings to the terminal 10. The user of the terminal 10 may then, using the service access point settings provided by the base station 14, manually configure the terminal 10 with the service access point settings provided by the base station 14. Once the terminal 10 has been configured with the proper service access point settings, such as service access point settings 1, the terminal 10 may be able to communicate with and/or through a service access point 29 transmitting with service access point settings 1.

Figure 6:
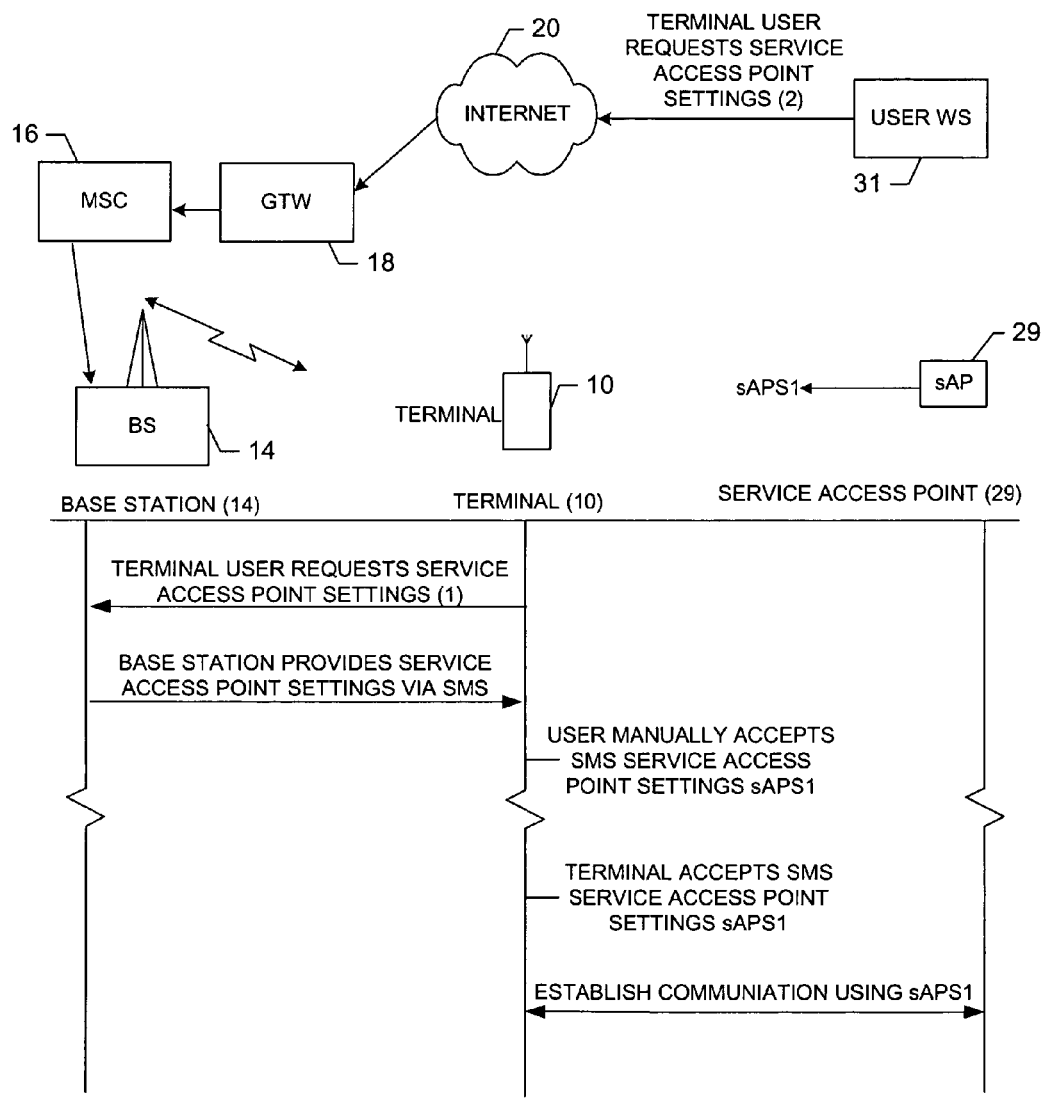
FIG. 6 is a diagram of conventional manual service access point SMS request and configuration.

As a further alternative, FIG. 6 is a diagram of conventional manual service access point SMS request and configuration. This semi-automated method is similar to the method described with reference to FIG. 5 where a user requests and is provided service access point settings for configuration of a terminal 10. By comparison to FIG. 5 where the wireless system provides communication through a base station 14, FIG. 6 shows an embodiment of a wireless communication system that permits a user of a terminal 10 to request service access point settings either (1) through a base station 14 or (2) using a workstation 31 connected to the Internet 20. If the user requests service access point settings from a base station 14, the procedure may be as described with reference to FIG. 5. However, if a user requests service access point settings via the Internet 20, the request may be submitted through a server gateway 18 to a mobile switching center 16 and then provided to the user of the terminal 10 via a base station 14, continuing the process as described with reference to FIG. 5. However, by comparison to FIG. 5, the embodiment of FIG. 6 shows that the base station 14 provides the service access point settings via a short message service (SMS) message. Where the service access point settings are provided as an SMS message, the user of the terminal 10 may be able to manually accept the service access point settings provided in the SMS message. Upon manual acceptance by the user, the terminal 10 may be configured with the service access point settings provided in the SMS message. The terminal 10 may then be able to communicate with and/or through a service access point 29 transmitting using the service access point settings 1 provided in an SMS message by the base station 14.

A service access point may be used by a terminal to download subscripted content, as further described herein with respect to enabling and providing service content specific downloads and pricing. One of ordinary skill in the art will recognize that embodiments of the present invention involving service access points are related only to wireless network systems that use service access points for communication with mobile terminals and, thus, may not currently include broadcast solutions such as DVB-T. One of ordinary skill in the art will also appreciate that service access point embodiments of the present invention can be used for both downloading and uploading solutions to and from mobile terminals.

In many embodiments for content delivery, a client application, such as a multimedia client application or large file download application, is delivered to a consumer on a multimedia memory card (MMC). The client application is used with the service provided by the network operator in order to provide content delivery and execution on a mobile terminal. As previously discussed, a mobile terminal, and the client application operating thereon, communicates with and/or through a service access point based upon service access point settings that are configured in the terminal. Client applications may be delivered on multimedia memory cards to end users of different mobile network operators using different service access point settings. Thus, each end user will need to have the correct service access point settings for that end user's subscription contract with the end user's mobile network operator.

Embodiments of the present invention are directed at automatically configuring the correct service access point settings on terminals. By automating the configuration of service access point settings on mobile terminals, the potential for error is decreased or removed in such a manner that content delivery and end user consumption of the content may become more reliable than systems that require manual input and/or interaction for configuration of service access point settings in mobile terminals. Also, by automating aspects of configuring service access point settings in mobile terminals, different service access points for different geographic areas may be selected based upon the location of the end user, as opposed to losing service as might occur if not using the present invention. As will be appreciated by one of ordinary skill in the art, by automating aspects of configuring service access point settings in mobile terminals, various other functional improvements may be implemented.

Figure 7:
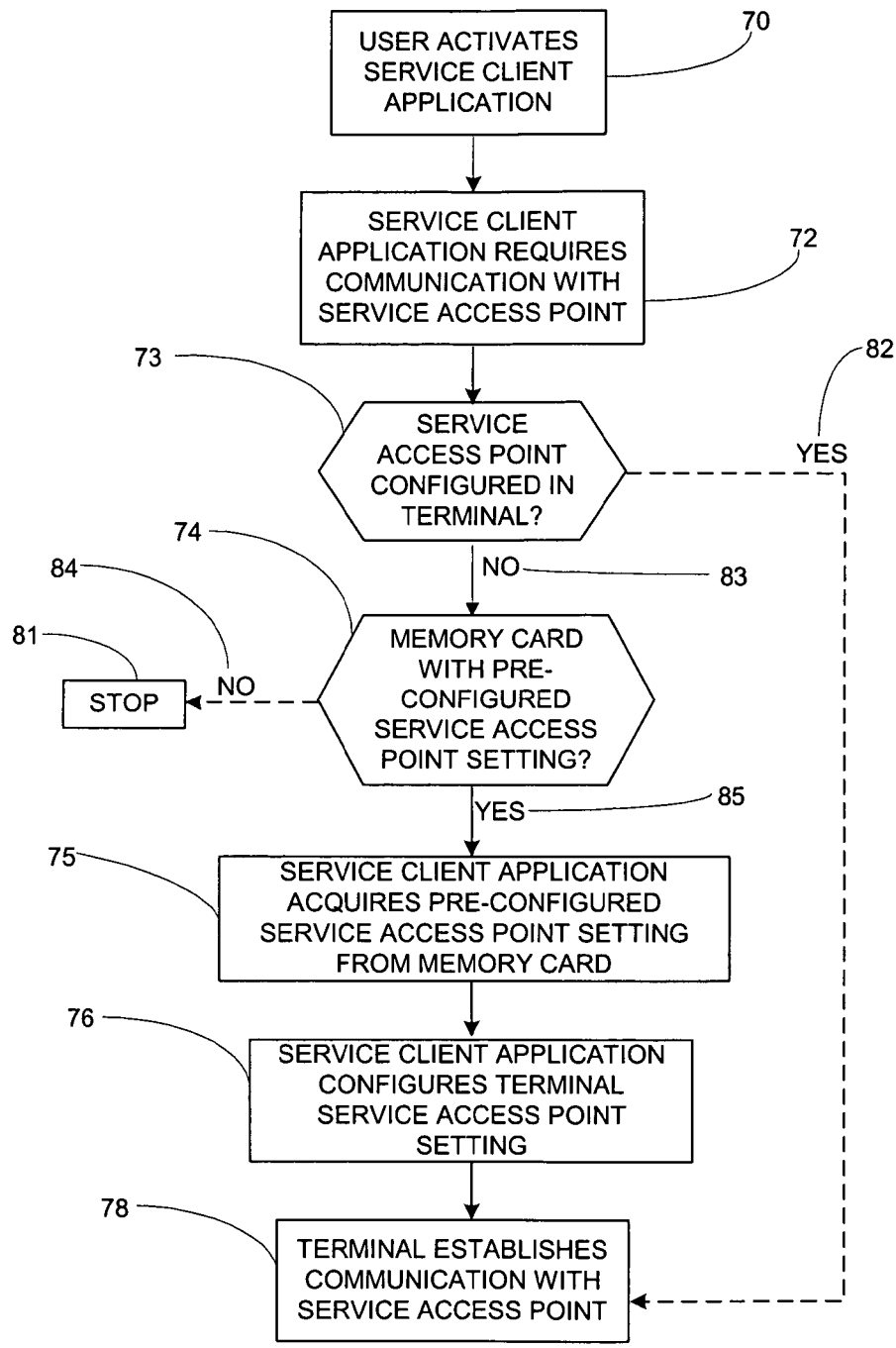
FIG. 7 is a flow chart of providing service access point settings to a mobile terminal, in accordance with embodiments of the present invention.

One embodiment for automating the configuration of service access point settings is by providing the service access point settings for different mobile network operators pre-installed on multimedia memory cards together with a client application. When the client application is invoked by the end user on the mobile terminal, the correct service access point settings are automatically configured on the terminal based upon the specific network operator functioning with the terminal. A flowchart of this embodiment for providing service access point settings to a mobile terminal according to the present invention is shown in FIG. 7. When the user activates the client application 70, the client application identifies that it requires communication with and/or through a service access point to acquire content and operate 72. The client application may first identify whether a correct service access point is configured in the terminal 73. If the mobile terminal is configured with an acceptable service access point 82, the client application may establish communication with and/or through the service access point 78 for content delivery and consumption. If either no service access point is configured in the terminal or an unacceptable service access point is configured in the terminal 83, the client application will attempt to acquire service access point settings from a multimedia memory card with pre-configured service access point settings 74. If no pre-configured service access point settings are available 84, the automated process may stop 81, thereafter prompting the user to configure a service access point such as by manually configuring the service access point or requesting service access point settings in an SMS message. However, if the memory card has been provided with pre-configured service access point settings 85, the client application will acquire a pre-configured access card setting from the memory card 75. The multimedia memory card may include a table or list of service access point settings, possibly associated with and organized by network operators, geographic locations such as according to time zones or available base stations, available content, etc. The client application may be able to automatically determine from the mobile terminal what network operator is being used and/or what service access point settings may be appropriate for the current geographic location of the mobile terminal and the intended content delivery and consumption activity or service of the client application. Alternatively, the user may be able to select a desired service access point setting from a list. The client application may invoke automatic configuration of the pre-configured service access point settings, acquired from the multimedia memory card, into the mobile terminal 76. The client application may operate using the pre-configured service access point setting on the multimedia memory card or, preferably, configure the service access point in the mobile terminal using the pre-configured service access point settings. With the properly configured service access point settings, the mobile terminal may establish communication with and/or through the service access point 78 in order to provide the client application with content for proper operation of the client application and mobile consumption by the user.

With respect to the service access point settings that may be provided as pre-installed on a multimedia memory card, one of ordinary skill in the art will recognize that service access point settings may include a service access point name, a user name, a password for the user name, an IP address, where and how a terminal IP address is allocated, what tunneling mechanism is used between a service access point and a server hosting the particular service being accessed through the service access point, data transfer billing, routing, and other information regarding transmission of information through the particular service access point. The information that is provided for a pre-installed service access point settings on a multimedia memory card is the information as required to configure a service access point in a mobile terminal, thus, together the information provides pre-configured service access point settings. Service access point settings, and any particular information that may be required to configure a service access point, may vary between different network operators. By providing alternate service access point settings on a multimedia memory card, a client application is not limited to a particular operator specific or service access point specific communication between a mobile terminal and a server gateway providing content for the client application. Thus, when the client application is enabled for use on the mobile terminal by the end user, in an embodiment of the present invention that provides alternate service access point settings pre-configured in a multimedia memory card, the correct settings for the client application and network operator communication will be taken into use by the mobile terminal as enabled by the client application and the pre-configured service access point settings provided on the multimedia memory card.

Figure 8:
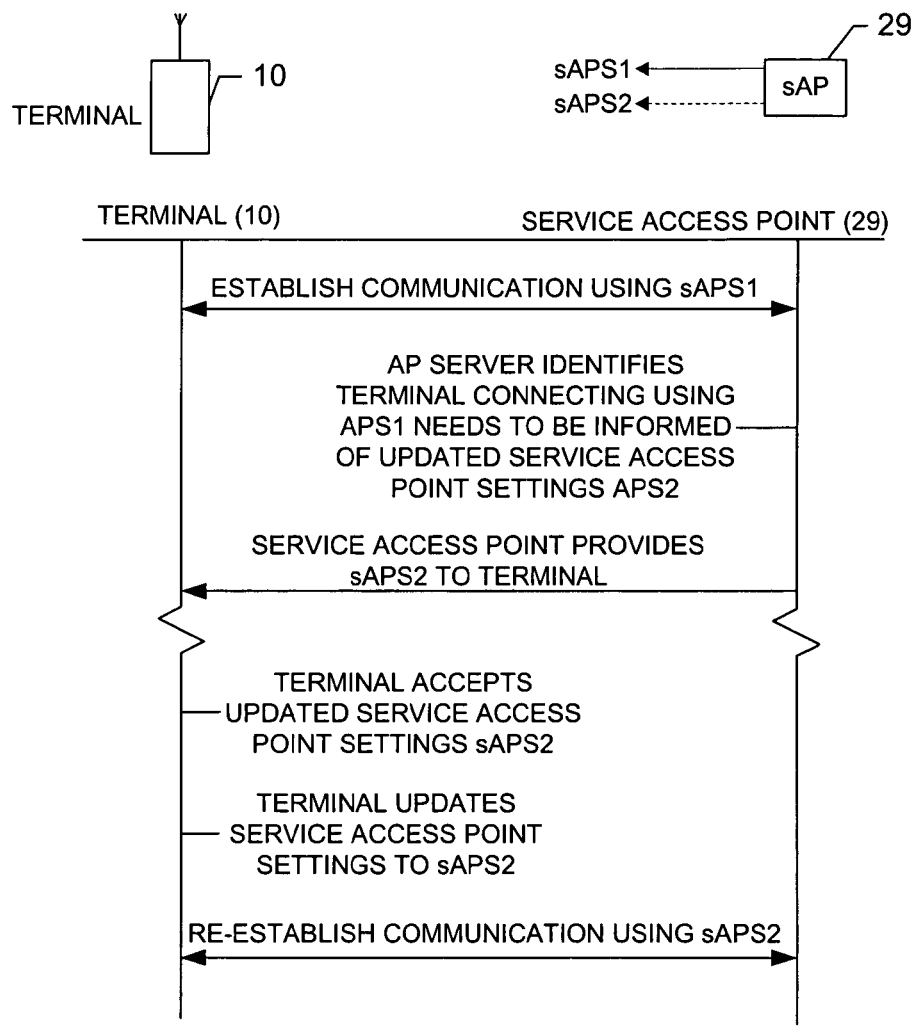
FIG. 8 is a diagram of updating service access point settings of a mobile terminal, in accordance with embodiments of the present invention.

Following an initial configuration of a service access point, the configuration for a service access point may need to be updated or changed, such as where a network operator changes the configuration for a service access point, or an alternative service access point may need to be used instead requiring configuration of service access point settings for the alternative service access point. FIG. 8 is a diagram of an embodiment for updating service access point settings of a mobile terminal in accordance with the present invention. As an alternative to or in addition to configuring a service access point based upon pre-configured service access point settings on a multimedia memory card, embodiments of the present invention also provide automatic update of a service access point that has been configured on the terminal. For example, in an embodiment of the present invention shown in FIG. 8, a terminal 10 may be configured to communicate with a service access point 29 using service access point settings 1 (sAPS1). However, the network operator may want or need to change the service access point settings for the service access point 29 from service access point settings 1 to service access point settings 2 (sAPS2). As with regard to FIG. 7 where pre-configured service access point settings are provided on a multimedia memory card, a multimedia content service and client application, and many other services utilizing GPRS connections, require not only that a service access point be configured with service access point settings, but that the service access point settings are correct such that the mobile terminal is able to communicate with the service access point. Thus, if the service access point settings change, such as if a network operator changes the configuration, the end user must also be able to update the settings in the mobile terminal 10. The embodiment shown in FIG. 8 provides for automated update of service access point settings to account for changes to service access point settings and use of additional or different service access points.

A service access point 29 may be configured with functional capability such that the service access point 29 identifies the service access point settings of mobile terminals 10 that connect to the service access point 29 to identify service access point settings that need to be updated. For example, if the terminal 10 is communicating with a wireless network or origin server through the service access point 29 using service access point settings 1, the service access point 29 may identify that terminal 10 needs to have its service access point settings updated to service access point settings 2. Thus, after the terminal 10 has established a communication with the service access point 29 using service access point settings 1, the service access point 29 will identify that terminal 10 needs to update to service access point settings 2 based upon the terminal's 10 use of service access point settings 1 and knowledge that a change should be made to service access point settings 2. Accordingly, the service access point 29 may provide service access point settings 2 to the terminal 10. The terminal 10 may accept the updated service access point settings 2 from the service access point 29. The terminal 10, possibly under control of a client application communicating with the service access point 29 and operating on the terminal 10, may then automatically update the service access point settings configured in the mobile terminal 10 to service access point settings 2. The mobile terminal 10, and a client application thereof, may then re-establish communication with the service access point 29 using service access point settings 2.

The embodiment described with respect to FIG. 8 provides for automatic update of service access point settings performed over-the-air. The service access point 29 knows that the service access point configuration is or has changed and delivers this information to a client application residing in the mobile terminal 10. Once the correct settings have been received by the mobile terminal 10, the client application may take the new service access point settings into use, and the client application service usage can continue.

An update or change from the old service access point settings to new service access point settings may occur under at least two scenarios. For example, the old service access point settings may become invalid when the new service access point settings begin to be used, or the new service access point settings and old service access point settings may both be valid or usable during a period of transition. In the case where the old service access point settings become invalid when the new service access point settings begin use, a problem arises that the end user or mobile terminal needs to know that the new service access point settings are going to take effect and needs to know the new service access point settings before the change occurs such that communication is not interrupted. Also, because the new service access point settings cannot be used until the new service access point settings are in service, when the old service access point settings are discontinued, the end user or mobile terminal needs to know when to switch from the old service access point settings to the new service access point settings. In an embodiment of the present invention, the client application on the mobile terminal may periodically request operating instructions from the service access point, referred to as periodic polling. Before the new service access point settings are in service for the service access point, the service access point may deliver instructions to the client application to change the service access point settings on the mobile terminal at a certain time in the future. Thus, the service access point may provide the new service access point settings to the client application before the service access point settings are required for use. Thus, the client application will have the new service access point settings prior to when the old service access point settings are discontinued. The service access point settings may provide instructions that the new service access point settings are required to be implemented at a relative period of time, for example, twenty minutes after receipt of the new service access point settings, or at an absolute time, for example, on Jan. 1, 2004, at 12:00:01 a.m. One of ordinary skill in the art will recognize that the relative or absolute time for implementation of the new service access point settings would likely be the time or the approximate time when the new service access point settings become valid and are used by the service access point. In addition, the instructions provided by the service access point may include instructions that connections to the service access point should not be made during a transitional period, referred to as a buffer time, to avoid possible problems, for example, delays in configuration changes by the network operator. The transitional period or buffer time may be, for example, one hour after the time when the transition from the old service access point settings to the new service access point settings takes place. Furthermore, because when the new service access point settings are implemented, numerous polling requests may be received from client applications, either at the transition time or after the buffer time expires, varying initial polling times for using the new service access point settings may be established for different mobile terminals such that the implementation to the new service access point settings may be implemented at staggered periods of time for different subsets of mobile terminals, referred to as a rolling implementation. The information required to establish a rolling implementation may be provided as further instructions by the service access point to the client application when conveying the new service access point settings. For example, if N subscribers use the service access point, the first quarter of those N subscribers may receive instructions to poll the service access point using the new service access point settings at Y minutes after the new service access point settings are in service at time X, the second quarter may receive instructions to poll at Y+Z minutes after the new service access point settings are in service at time X, the third quarter at X+Y+2Z, and the fourth quarter at X+Y+3Z.

In the situation where the old service access point settings and the new service access point settings are both operational during a certain period of transitional time, the transition from the old service access point settings to the new service access point settings may be less complicated. Because client applications periodically poll or request operating instructions from the service access point, the service access point may implement the new service access point settings on a rolling implementation inherent in the varying poll requests from client applications of different mobile terminals, thus eliminating instructions to create a rolling implementation. And because both the old and new service access point settings are operational during the transitional period, after first updating the service access point settings on the mobile terminal, the client application may immediately begin using the new service access point settings without concern for service interruption between termination of the first settings and activation of the second settings.

By performing service access point settings configuration using the previously described embodiments of the present invention, the possibility of incorrectly configuring service access point settings on a mobile terminal is reduced if not avoided or eliminated and the configuration update process may be invisible to the user of the mobile terminal, thus providing a better end-user experience of the client application and content delivery.

Figure 9:
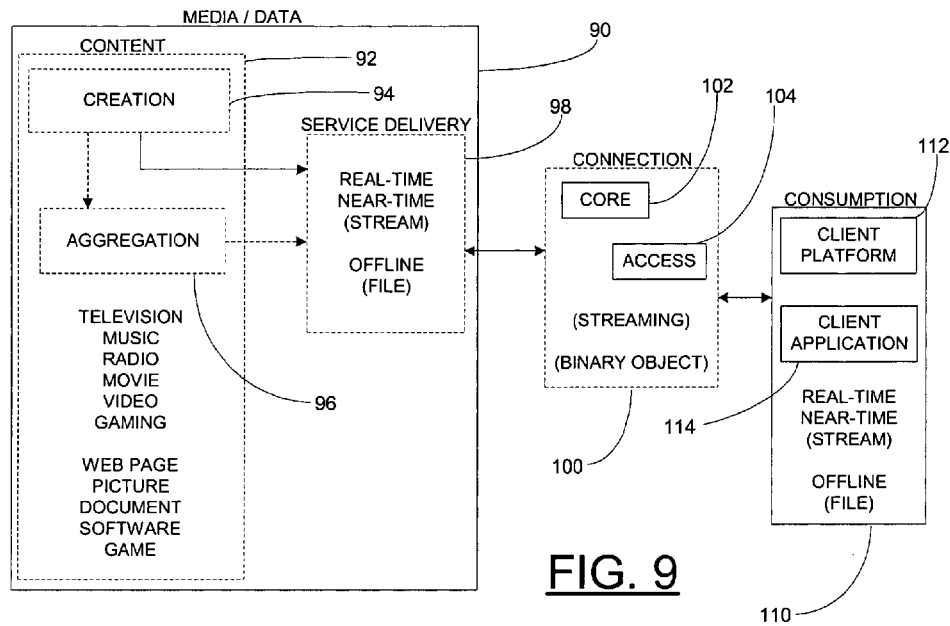
FIG. 9 is a schematic block diagram of a content system and wireless communication system for delivering content for mobile consumption.

An example schematic block diagram of a content system and wireless communication system for delivering content for mobile consumption is provided in FIG. 9. The media or data 90 which is consumed by the user at the mobile terminal 110 typically is content 92 created 94, and possibly brought together or aggregated 96, and provided for delivery 98 to the mobile terminal. The aggregation of content 96 is equivalent to a TV broadcaster that brings together content from different content creators. The entity providing the content for delivery may be referred to as the content provider which may be the content creator or the content aggregator, or both where the creator is also an aggregator. Examples of media that may be created or aggregated are television media, music, radio, movies, videos, gaming, web pages, pictures, documents, software, and game applications. One of ordinary skill in the art will recognize these to be just examples of the media and data that can be provided to a mobile terminal. Once the content 92 has been created 94 and possibly also aggregated 96, the content 92 may be delivered 98 in various methods, such as real-time, near-time, streaming, and offline. Bringing together the media 90 and the user of the mobile terminal for consumption 110 is the connection 100 provided by the wireless service provider or network operator. Service provider and network operator businesses can be separated into core network operations 102, referring to non-wireless access related network elements and operations such as SGSN and GGSN, and access network operations 104, referring to wireless access related network elements and operations, for providing different methods of content delivery 98 to a mobile user. For example, the content 92 may be provided for real-time and near-time as streaming data, and content 92 for offline consumption or storage may be provided as a binary object. When content is received by a mobile terminal, the user is able to consume the content using end user equipment such as the mobile terminal and, typically, an application operating upon the mobile terminal. The end user equipment and application may be provided in the form of a client platform 112, such as the exemplary description with reference to FIG. 2, and a client application 114 that may be provided by the manufacturer of the mobile terminal. However, one of ordinary skill in the art will recognize that third party applications may also be used to consume content.

Real-time consumption of content refers to a connection between a mobile terminal and a server in a wireless network. An example of real-time consumption is the streaming of video using cellular or wireless technologies such as GPRS (General Packet Radio Service), EDGE (Enhanced Data Rates for Global Evolution), WCDMA (Wideband Code Division Multiple Access), CDMA (Code Division Multiple Access), WLAN (Wireless Local Area Network), and BT (Bluetooth) connections. Other examples of real-time consumption are the reception of broadcast content using technologies such as IPDC and MBMS. Near-time consumption refers to consumption of media or data that is delivered to a mobile terminal and consumed after the media or data has been received by the mobile terminal. For example, web pages may be delivered to a mobile terminal and, thereafter, displayed by a web browser. Offline consumption refers to the situation where particular content is downloaded to a mobile terminal and used at a time subsequent to reception. The content may be downloaded to a mobile terminal using the above-mentioned cellular technologies, or broadcast technologies described with reference to real-time streaming consumption of video. Offline content may be stored in mobile terminals, such as in memory or on a multimedia memory card, memory stick, memory card, hard disk, or other memory storage device. Typically, each of these media delivery methods, real-time, near-time, and offline, will allow a user to consume content using a client application such as a media player. For example, Real Networks, Inc., provides a client application for consuming video and audio called the RealOne® RealPlayer®. This type of client applications may be used to decode content that has been provided in a standardized or proprietary video and/or audio coding format, such as the RealVideo® 7, 8, 9, and 10 proprietary video coding formats developed by Real Networks, Inc. Similar coding formats are the MPEG-4 and H.263 coding formats.

As may be understood by one of ordinary skill in the art, existing pricing models for content delivery do not appropriately account for 3G technologies such as the much larger amount of data that may be provided over a 3G wireless network and do not accordingly provide for sufficient consumer understanding of bandwidth implications for receiving a particular selection of content, i.e., much larger and more difficult and costly to deliver than anticipated by the consumer. For example, a user may desire to subscribe to and receive a particular television series. The individual television episodes or programs to be delivered to the user's mobile terminal from a content delivery platform via a cellular network may be consumed in real-time, near-time, or offline. Regardless of the consumption method, the delivery of this type of content requires a transfer of a large amount of data to the mobile terminal. For example, a twenty-two minute television program with a bit rate of one hundred kilobits per second (100 kbps) requires a transfer of approximately 16.5 megabytes (MB) of data. If the end user subscribes to a specific television series that airs one new episode each day, the total bandwidth transfer may be on the order of 500 megabytes of data per month. By comparison, a typical flat rate pricing model for wireless connectivity that allows a fixed amount of data and an increased price for additional data may allow 100 megabytes of data per month and additional costs for each additional megabyte. For example, in Europe each additional megabyte may cost as much as 1 Euro, making the connection price for subscribing to a daily television program several hundred Euros per month. Existing pricing models simply do not account for the improvements and related implications of 3G wireless services that can provide the download of much greater quantities of information. Thus, improved service methods and pricing models of the present invention may be employed for 3G wireless content and services, particularly for implementation of content specific subscriptions by end users. To avoid confusion, we note that data flow is typically referred to in bits, such as kilobits per second (kpbs), and that data storage is typically referred to in bytes, which are equal to eight bits, such as megabytes (MB).

Although existing flat rate pricing models could accommodate some 3G wireless content and services, the basic business fundamental for flat rate pricing comes from being able to predict average bandwidth usage per user. However, because 3G content presents a significantly greater variation of potential user bandwidth averages, the existing flat rate model does not provide significant variation and customization for content and services that may be provided to and requested by an end user. Thus, one of ordinary skill in the art will recognize that embodiments of the present invention incorporate both a content specific element and a service specific element such that a service content specific pricing embodiment may be used that allows for variations in the type and amount of content that may be consumed by the end user to advantageously provide 3G content and services using advantageous associated pricing models. In such embodiments of the present invention, an end user gets a particular price for content delivery depending upon the service requested where the connection price and content price are included in a service content specific pricing.

An example of an embodiment of the present invention for enabling service content specific pricing is where an end user chooses to receive a prime time television broadcast from a particular television network each day of the week. A similar example may be where an end user chooses to receive a sports newscast twice a day, seven days a week. A further example may be where a user chooses to receive re-run episodes of one television series on Mondays, Wednesdays, and Fridays and re-run episodes of another television series on Tuesday, Thursdays, and Saturdays. These example embodiments are provided only to facilitate understanding of the present invention and are not limiting examples. The embodiments of the present invention shown in FIGS. 10, 11, 12, and 13 provide further description of providing service content specific pricing.

Figure 10:
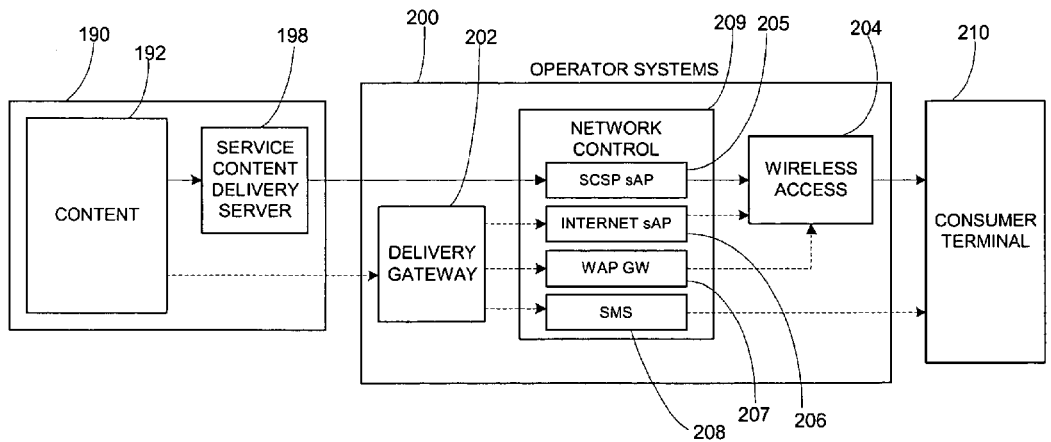
FIG. 10 is a schematic block diagram of content delivery and wireless delivery to a mobile terminal for enabling service content specific pricing, in accordance with embodiments of the present invention.
Figure 11:
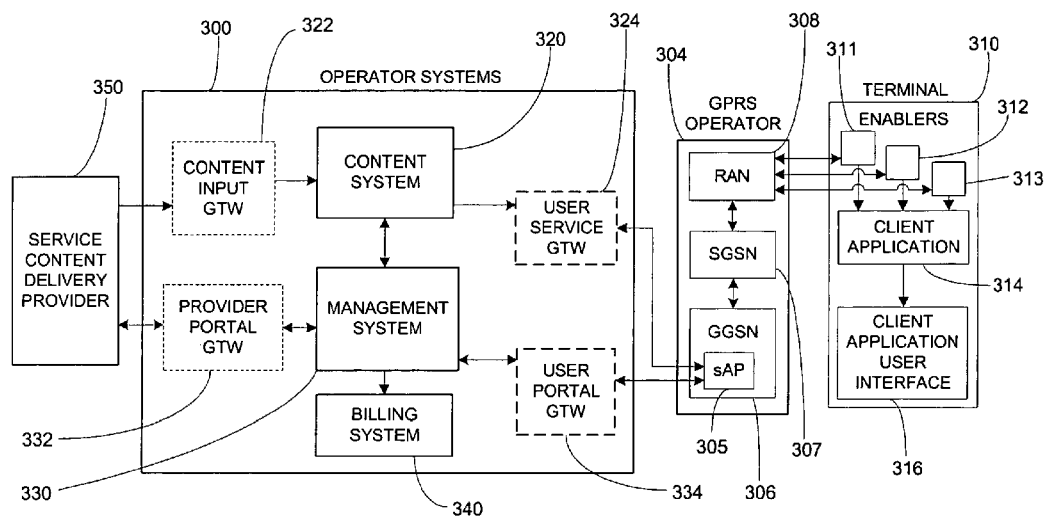
FIG. 11 is a schematic block diagram of a content specific delivery to a mobile terminal, in accordance with embodiments of the present invention.

In order to address problems presented by increased bandwidth of 3G content and the services to provide such increased bandwidth content to a mobile terminal, this aspect of the present invention may be embodied as shown in FIG. 10 as a schematic block diagram of content delivery and wireless delivery to a mobile terminal for enabling content specific pricing. In a service content specific pricing model of the present invention, the connectivity provider and the content provider may enter into an agreement for providing specific content based on pricing models available to the end user. The content 192 may be provided via a delivery gateway 202 for typical mobile consumption, and through a service content delivery server 198 for consumption by a consumer using mobile terminal 210 through wireless access 204, such as a radio access network and associated support nodes described below with reference to FIG. 11, provided by the wireless service provider and where the mobile terminal 210 has access to a service content specific pricing service access point 205 through which the specific content for a pricing model is delivered. Using generally available service access points for different media may not be practically viable. Thus, for service content specific pricing, service content specific pricing service access points may be used such that the supporting network system may have the ability to transfer different media content to mobile terminals under pricing models in accordance with consumer usage and consumer media selection and in accordance with mobile operator, service provider, and content provider operations. Service content specific pricing service access points 205 are one aspect of this improved infrastructure of the present invention as described below.

Embodiments of the invention of providing service content specific pricing present the problem of controlling access to content and download of specific content through service access points. This problem can be resolved using previously described embodiments of the invention of providing the user the ability to gain connection to service access points and updated service access points. One embodiment for providing the service content specific pricing model is to establish exclusive service access points for different content; hence, service content specific pricing content may only be available to subscribers via a particular service access point, a service content specific pricing service access point, such as used by and for access to the service content delivery server 198 in FIG. 10. And content acquired via this service access point and bandwidth usage thereof may, accordingly, not count against the users' primary subscription plan, but would be covered by the service content specific pricing subscription.

FIG. 11 is a schematic block diagram depicting service content specific pricing content delivery to a mobile terminal in accordance with an embodiment of the present invention. The wireless provider or network operator 300 and a content provider 350, such as a content creator or content provider, agree to specific content from which a user may select for service content specific pricing content delivery. The service content specific pricing content is provided through a content input gateway 322 into a content system 320 of a network operator 300. When required, the service specific content is delivered to a user through a user service gateway 324 to a general packet radio service operator 304 which may be the network operator 300. The content may be provided through a service access point 305 of a gateway GPRS support node (GGSN) 306 to a signaling GPRS support node (SGSN) 307 and then to a radio access network (RAN) 308. A GGSN/SGSN media gateway may provide protocol and media conversion to support packet switched services for interconnection with a radio access network. A radio access network may be a combination of a radio mode controller (RMC) and a radio base station (RBS). A radio base station may communicate wirelessly with mobile terminals. Enablers 311, 312, 313 may be used in the mobile terminal 310 in order to interpret the wireless communications from the radio access network 308. Enablers refer simply to software components of a mobile terminal that provide services. A client application 314 of the mobile terminal 310 may decode the content provided to the mobile terminal 310 and present the content to the user through a client application user interface 316 for consumption by the end user.

In one embodiment of the present invention, the content provider may feed content to the network operator's content system 320 through a content input gateway 322, and upon reception, the content system may notify the network operator management system 330 of the additional content that has been received. In an alternative embodiment in the present invention, the content provider may interact with the network operator management system through a provider portal gateway 332 in order to update and manage the content that is provided through the content input gateway 322 to the content system 320. In this manner, the content provider may be able to control the content that is currently available for service content specific pricing. Varying service content specific pricing models may be created for specific sets of content, for different service access points, or other variations of content and connectivity. The network operator may also be involved in controlling the different service content specific pricing models that are available to the end user. In an embodiment of the present invention, an end user may be able to communicate with the network operator in order to subscribe to a service content specific pricing delivery model through a user portal gateway 334 that may provide the user the ability to interact with the available service content specific pricing content and delivery models as established and configured in a management system 330. Upon selection and subscription, the management system 330 may notify the content system 320 to deliver specific content to an end user. An example service content specific pricing subscription by a consumer may provide the consumer the ability to receive and consume a half hour news program every day, delivered at a time after the news program airs on network or cable television such as for 24 hours following 6:30 p.m. when the 6:00 p.m. national news program ends, for a single fee for both delivery and consumption of this content. Similarly, the subscription may provide for real-time delivery and consumption of content such as providing the consumer the ability to watch a morning news and entertainment program while riding public transportation to work in the morning at the same time the program airs on network or cable television.

Service content specific pricing relies upon interaction between a service provider and a content provider. Similarly, these parties may be involved in creating agreements as to varying prices for the content that is provided and the associated connectivity costs. For example, the more popular the content, the higher the price that may be associated with providing the content. Similarly, the larger the bandwidth required for the delivery of the content, the higher the cost for the connectivity for delivering the content. One of ordinary skill in the art will recognize that service content specific pricing provides the opportunity for a service provider to make agreements with a content provider based upon particular user access to the content. For example, service provider A may be able to make an agreement with content provider for decreased price of particular content based upon the fact that service provider A may be able to market the content of content provider at a greater rate or to a broader or focused audience of potential customers, thereby increasing the overall total consumption of content provider's content. By comparison, service provider B may not be able to provide the same amount of end user consumption and, therefore, may not be able to receive the discounted price available to service provider A. Similarly, one or ordinary skill in the art may recognize that a service provider may be able to make an agreement with a content provider such that the service provider is able to retain a portion of the content price in exchange for offering or delivering particular content. One of ordinary skill in the art will also recognize that variation in these types of service provider-content provider agreements may be influenced by any number of market implications or other factors.

Returning to the embodiment of the present invention shown in FIG. 10, service content specific pricing may require a separate service content specific service access point 205 in order to be able to control and measure the content that is delivered for service content specific pricing and is accessible to end users for mobile consumption. Thus, this embodiment of the present invention effectively comes full circle by incorporating the need for updating service access point settings and the ability to provide service content specific pricing models for 3G content and service technologies. By using a service content specific pricing service access point 205, a wireless service provider may be able to build into the infrastructure of the operator systems 200 access to specific services, potentially at specified times and/or to specified users. A service content specific pricing service access point 205 may be used in such a way that content delivery through the service content specific pricing service access point 205 does not generate billing that otherwise increases the cost associated with the delivery of the content. For example, if an end user has a monthly service cost for typical wireless use and further subscribes to service content specific pricing, any content delivery through service content specific pricing service access point 205 will not create additional charges against the bandwidth allowance for the standard monthly service subscription. The billing associated with a service content specific pricing service access point 205 may be in accordance with the agreement between the content provider and the service provider.

FIG. 12 is a schematic block diagram of a content system in a wireless communication system for implementing and providing service content specific pricing to a consumer in accordance with the embodiments of the present invention. As previously described, various agreements may be made between a service provider or a mobile operator and a content provider such as a content creator or a content aggregator. FIG. 12 shows different variations on billing scenarios for service content specific pricing. One advantage of the present invention is that the consumer 410 is merely concerned with receiving the desired and requested content from the service provider 400. In order to receive the requested content, the consumer 410 makes a single payment for both the content and the delivery of the content to the consumer 410. The payment may be a single payment to a billing service provider 482 that is then in communication with at least the service provider 400. A single payment from the consumer 410 may flow directly to the service provider 400. Or a single payment may be made to a billing service provider 484 that is in communication with the service provider 400 and the content creator 452. All of these variations for payment shown in FIG. 12 are examples of different agreements in billing variations for service content specific pricing. An embodiment of the present invention for providing service content specific pricing also requires an agreement be made for delivery of service content specific pricing content to the service provider 400. The content may be created by a content creator 452 and aggregated by a content aggregator and possibly also a content service provider 454 or may flow directly from the content creator 452 to the service provider or mobile operator 400.

FIG. 13 is a schematic block diagram of a content system and a wireless communication system of one embodiment of the present invention for implementing and providing service content specific pricing to a consumer. Although the embodiment shown in FIG. 13 may resemble current pricing models, the selection and request of the content that is to be provided to the consumer will include both the cost of the content and the cost of the connectivity fee such that the consumer is able to subscribe to service content specific pricing separate from the user's standard subscription cost for the typical wireless services and use of the mobile terminal.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising:
wirelessly receiving, at a mobile terminal, a service via a first service access point to a network;
automatically and periodically initiating, at the mobile terminal, a request to receive, from the first service access point, a service access point setting to access the service via a second service access point;
wirelessly receiving, at the mobile terminal, the service access point setting and at least one instruction via the first service access point; and
replacing, at the mobile terminal, a current setting associated with the first service access point with the received setting based, at least in part, on the at least one instruction,
wherein the first and second service access points operate independently from each other as a data tunnel connecting the mobile terminal to the service via a gateway.

2. A method of claim 1, further comprising:
establishing a communication connection with the second service access point; and
accessing the service through the second service access point using the received setting.

3. A method of claim 1, wherein the at least one instruction comprises timing for the initiation of the request, during either a transition of service access point settings, or after the received setting is implemented, or a combination thereof.

4. A method of claim 3, further comprising:
varying implementation timing of the received setting based, at least in part, on one of a plurality of staggered periods established for a plurality of mobile terminals.

5. A method of claim 1, wherein the at least one instruction is associated with an operator of the network, a service provider, a content provider, an enterprise, or a combination thereof.

6. A method of claim 1, wherein the mobile terminal is a mobile phone.

7. A method of claim 1, wherein either the first service access point and a second service access point are included in one network node, or the first service access point and the second service access point are respectively included in two network nodes.

8. A method of claim 1, wherein the network is configured to provide exclusive service access points for specific content.

9. A method of claim 1, further comprising:
initiating a switching to the second service access point by the network.

10. A method of claim 1, wherein the service access point setting for the second service access point is configured for delivery of content-specific pricing.

11. A method of claim 1, wherein the service access point setting is identified as needed to be updated by the network.

12. A method of claim 1, wherein the first and second service access points further operate independently from each other as a data tunnel between a gateway support node and the service, and wherein the gateway support node supports the gateway for digital video broadcasting, digital audio broadcasting, multimedia broadcast/multicast service, enhanced data rates for global evolution, wideband code division multiple access, code division multiple access, wireless local area network, Bluetooth, or a combination thereof.

13. An apparatus comprising:
   at least one processor; and
   at least one memory including computer program code,
   the at least one memory and the computer program code configured to, with the at least one processor, cause the apparatus to perform at least the following,
      wirelessly receive a service via existing first service access point to a network;
      automatically and periodically initiate a request to receive from the first service access point a service access point setting to access the service via a second service access point;
      wirelessly receive the service access point setting and at least one instruction via the first service access point; and
      replace a current setting associated with the first service access point with the received setting based, at least in part, on the at least one instruction,
      wherein the apparatus is embedded in a mobile terminal, and the first and second service access points operate independently from each other as a data tunnel connecting the mobile terminal to the service via a gateway.

14. An apparatus of claim 13, wherein the apparatus is further caused to:
   establish a communication connection with the second service access point; and
   access the service through the second service access point using the received setting.

15. An apparatus of claim 13, wherein the at least one instruction comprises timing for the initiation of the request, during either a transition of service access point settings, or after the received setting is implemented, or a combination thereof.

16. An apparatus of claim 15, wherein the apparatus is further caused to:
   vary implementation timing of the received setting based, at least in part, on one of a plurality of staggered periods established for a plurality of mobile terminals.

17. An apparatus of claim 13, wherein the at least one instruction is associated with an operator of the network, a service provider, a content provider, an enterprise, or a combination thereof.

18. An apparatus of claim 13, wherein the mobile terminal is a mobile phone.

19. An apparatus of claim 13, wherein either the first service access point and a second service access point are included in one network node, or the first service access point and the second service access point are respectively included in two network nodes.

20. An apparatus of claim 13, wherein the network is configured to provide exclusive service access points for specific content.

21. An apparatus of claim 13, wherein the apparatus is further caused to:
   initiate a switching to the second service access point by the network.

22. An apparatus of claim 13, wherein the service access point setting for the second service access point is configured for delivery of content-specific pricing.

23. An apparatus of claim 13, wherein the service access point setting is identified as needed to be updated by the network.

24. An apparatus of claim 13, wherein the first and second service access points further operate independently from each other as a data tunnel between a gateway support node and the service, and wherein the gateway support node supports the gateway for digital video broadcasting, digital audio broadcasting, multimedia broadcast/multicast service, enhanced data rates for global evolution, wideband code division multiple access, code division multiple access, wireless local area network, Bluetooth, or a combination thereof.

25. A non-transitory computer-readable storage medium carrying one or more sequences of one or more instructions which, when executed by one or more processors, cause an apparatus to at least perform the following steps:
   wirelessly receiving a service via a first service access point to a network;
   automatically and periodically initiating a request to receive, from the first service access point, a service access point setting to access the service via a second service access point;
   wirelessly receiving, at the mobile terminal, the service access point setting and at least one instruction via the first service access point; and
   replacing, at the mobile terminal, a current setting associated with the first service access point with the received setting based, at least in part, on the at least one instruction,
   wherein the apparatus is embedded in a mobile terminal, and the first and second service access points operate independently from each other as a data tunnel connecting the mobile terminal to the service via a gateway.

26. A non-transitory computer-readable storage medium of claim 25, wherein the apparatus is caused to further perform:
   establishing a communication connection with the second service access point; and
   accessing the service through the second service access point using the received setting.

* * * * *